United States Patent

[11] 3,572,864

[72] Inventors William L. Arrington
Batavia;
Patrick J. Micari, Fairport, N.Y.

[21] Appl. No. 826,349
[22] Filed May 21, 1969
[45] Patented Mar. 30, 1971
[73] Assignee Sylvania Electric Products, Inc.

[54] TELEVISION CABINET PROVIDING FULL ACCESS TO CHASSIS UNDERSIDE
5 Claims, 4 Drawing Figs.

[52] U.S. Cl. .......... 312/7
[51] Int. Cl. .......... A47b 81/06, H05k 5/00
[50] Field of Search .......... 312/7

[56] References Cited

UNITED STATES PATENTS

| | | | |
|---|---|---|---|
| 2,793,091 | 5/1957 | Christians .......... | 312/7 |
| 3,359,374 | 12/1967 | Joseph .......... | 312/7 |

*Primary Examiner*—Patrick D. Lawson
*Attorneys*—Norman J. O'Malley, Donald R. Castle, Thomas H. Buffton and Edward J. Coleman

ABSTRACT: A television receiver construction wherein an enclosure includes a pair of side panels and a chassis is attached to the side panels to provide the major bottom structural support for the side panels. Access to the chassis underside is effected by a separable bottom cover slidably engageable by guide supports affixed to the side panels and held captive by a cabinet back cover.

PATENTED MAR 30 1971

3,572,864

SHEET 1 OF 3

INVENTORS
WILLIAM L. ARRINGTON &
PATRICK J. MICARI
BY
Donald R. Castle
ATTORNEY

INVENTORS
WILLIAM L. ARRINGTON &
PATRICK J. MICARI
BY
Donald R. Castle
ATTORNEY

INVENTORS
WILLIAM L. ARRINGTON &
BY PATRICK J. MICARI
Donald R. Castle
ATTORNEY

TELEVISION CABINET PROVIDING FULL ACCESS TO CHASSIS UNDERSIDE

BACKGROUND OF THE INVENTION

This invention relates generally to television receivers and, more particularly, to an improved cabinet construction for a television receiver which permits convenient access to the full underside of the chassis for servicing.

Heretofore, television receiver cabinets have been boxlike structures including a bottom shelf integrally attached to the side panels for providing rigid support and upon which the chassis is mounted. Past approaches toward providing service accessibility in such cabinets, without the necessity of removing the chassis, have included the provision of one or more access holes in the bottom shelf of the cabinet. As the bottom shelf is a structural member of the cabinet, however, these service apertures have typically been much smaller than the chassis area, thereby providing only partial access to the receiver circuitry of the chassis. In addition, the common use of strengthening ribs in cabinet bottoms results in a further reduction of access to the chassis underside.

For purposes of safety, the bottom shelf access holes generally have been covered by panels attached with screws, a practice detracting from servicing convenience and adding significantly to cabinet cost. Another approach has been to employ a relatively complex and cumbersome slidable enclosure which engages four tracks interior of the cabinet base.

OBJECTS AND SUMMARY OF THE INVENTION

With an awareness of the aforementioned disadvantages of the prior art, it is an object of the present invention to provide an improved cabinet construction for television receivers.

It is another object of the invention to provide a simplified television receiver cabinet structure which permits convenient service access to the full underside of the chassis.

Briefly, these objects are attained by a television receiver cabinet structure comprising a bottomless enclosure having a pair of side panels to which the receiver chassis is attached. The assembly is such that the chassis comprises the major bottom structural support for the side panels. A bottom cover is provided for slidable engagement with a pair of guide supports attached to the side panels below the chassis, and a back cover is adapted for attachment to the enclosure to retain the bottom cover in place. In this manner, after having removed the back cover, service access to the full underside of the chassis is facilitated merely by sliding out the bottom cover.

BRIEF DESCRIPTION OF THE DRAWINGS

This invention will be more fully described hereinafter in conjunction with the accompanying drawings, in which.

DESCRIPTION OF THE PREFERRED EMBODIMENT

For a better understanding of the present invention, together with other and further objects, advantages and capabilities thereof, reference is made to the following disclosure and appended claims in connection with the above-described drawings.

Figure 1:
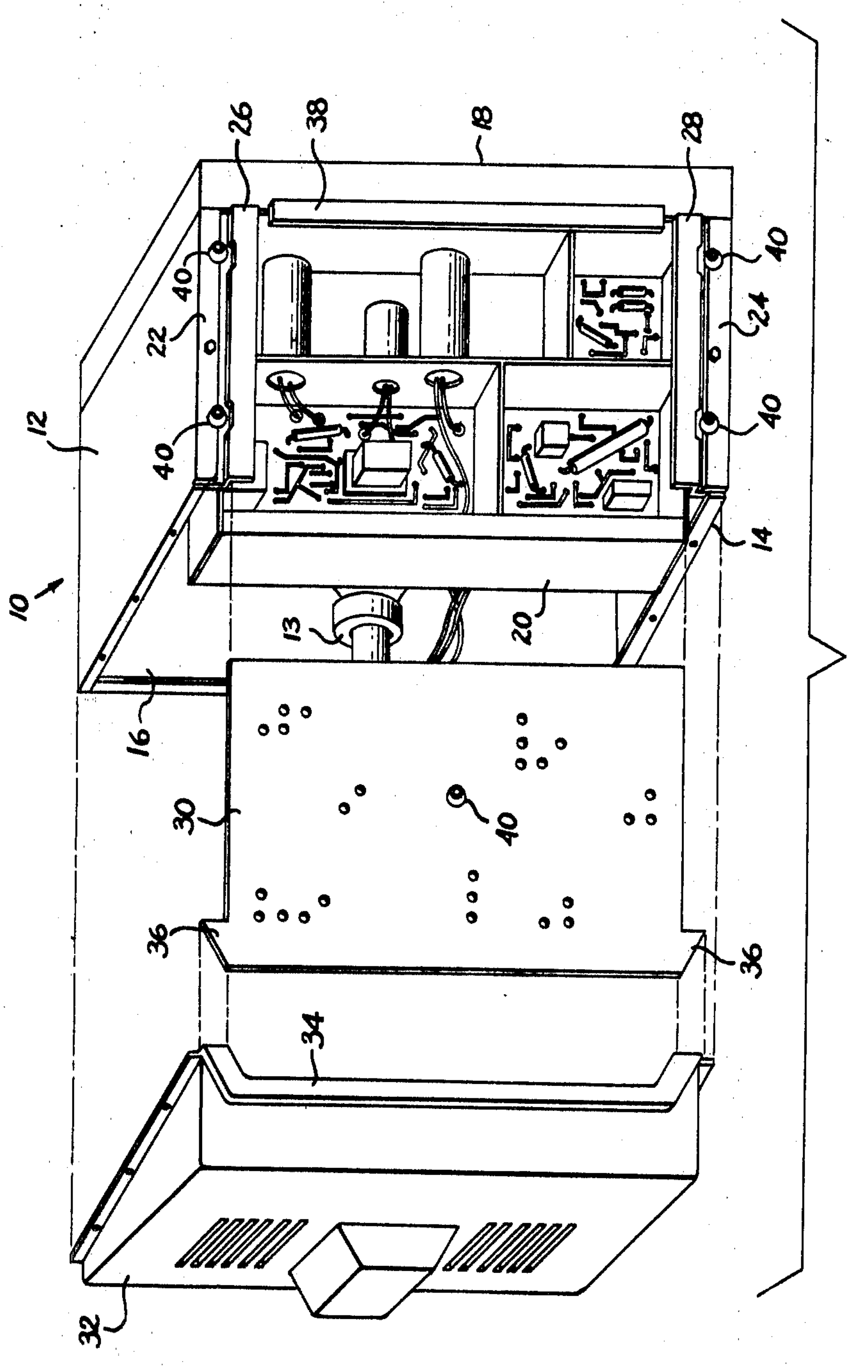
FIG. 1 is an exploded perspective view of a television receiver cabinet in accordance with the invention.

Referring to FIG. 1, a television receiver cabinet structure according to the invention is shown as comprising an enclosure 10 having a pair of side panels 12 and 14. The enclosure also includes a top panel 16 and a front portion 18, not fully shown, adapted for viewing the image on a picture tube 13. In this particular embodiment, enclosure 10 is completely bottomless to enable access to the full underside of a chassis 20 positioned therein. Without bottom support means, such an enclosure 10 would not exhibit the structural rigidity generally required of a television cabinet, particularly if the enclosure 10 were fabricated from a thin gauge plastic or metal material. Accordingly, to avoid the need for strengthening ribs across the underside of the enclosure 10, a chassis 20 is attached to the side panels 12 and 14 so as to comprise the major bottom structural support for the enclosure 10. More specifically, the side panels 12 and 14 have respective inwardly projecting side panel flanges 22 and 24 along the bottom peripheries thereof to which the side edges of the chassis 20 are attached.

To provide safety closure of the chassis underside during normal operation, a pair of guide supports 26 and 28, preferably of molded plastic insulating material, are attached to the side panel flanges 22 and 24, respectively, and a separable bottom cover 30 is provided for slidably engaging the guide supports 26 and 28. A back cover 32 attached to the rear of enclosure 10 is adapted to retain the bottom cover 30 in engagement with the guide supports 26 and 28 by means of a contoured support portion 34 formed to mate with the rear edge of the bottom cover 30. A pair of projecting earlike portions 36 on opposite sides of the bottom cover 30 near its back edge are provided to function as stops during the slidable insertion of the bottom cover 30 into the guide supports 26 and 28, and an elongated retaining member 38 is attached to the front portion 18 of the enclosure 10 to provide support for the leading edge of the inserted bottom cover 30. The back portions of the projecting earlike portions 36 are tapered to facilitate engagement with the contoured support portion 34 of the back cover 32. The cabinet also includes five mounting feet 40, two attached to each of the side panel flanges 22 and 24 and one attached to the center portion of the bottom cover 30.

Figure 2:
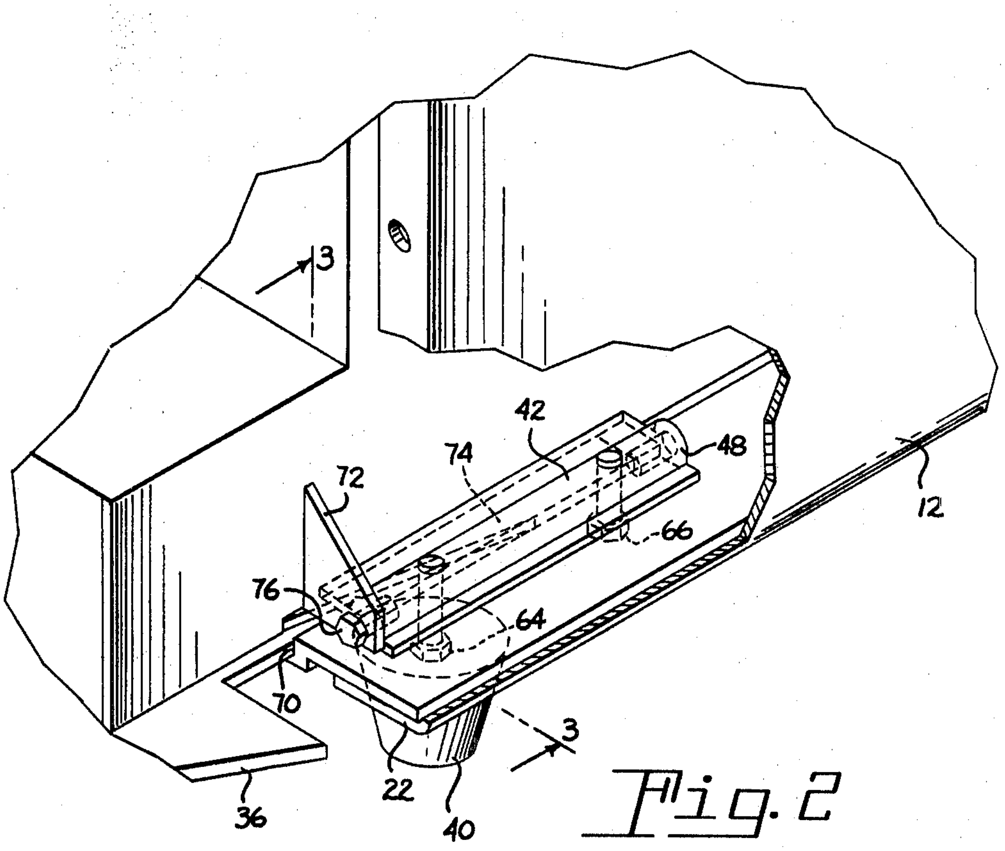
FIG. 2 is a partial isometric view with the cabinet side panel cut away to show one of the chassis and guide support mounting assemblies, with the bottom cover partially withdrawn.
Figure 3:
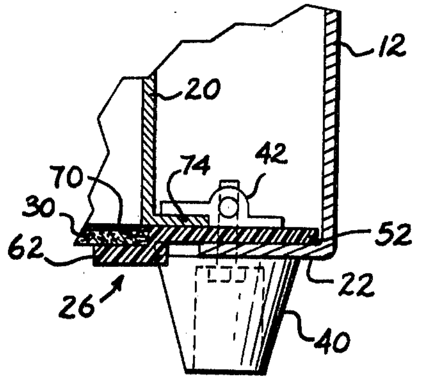
FIG. 3 is a sectional view taken along the line 3–3 of FIG. 2.
Figure 4:
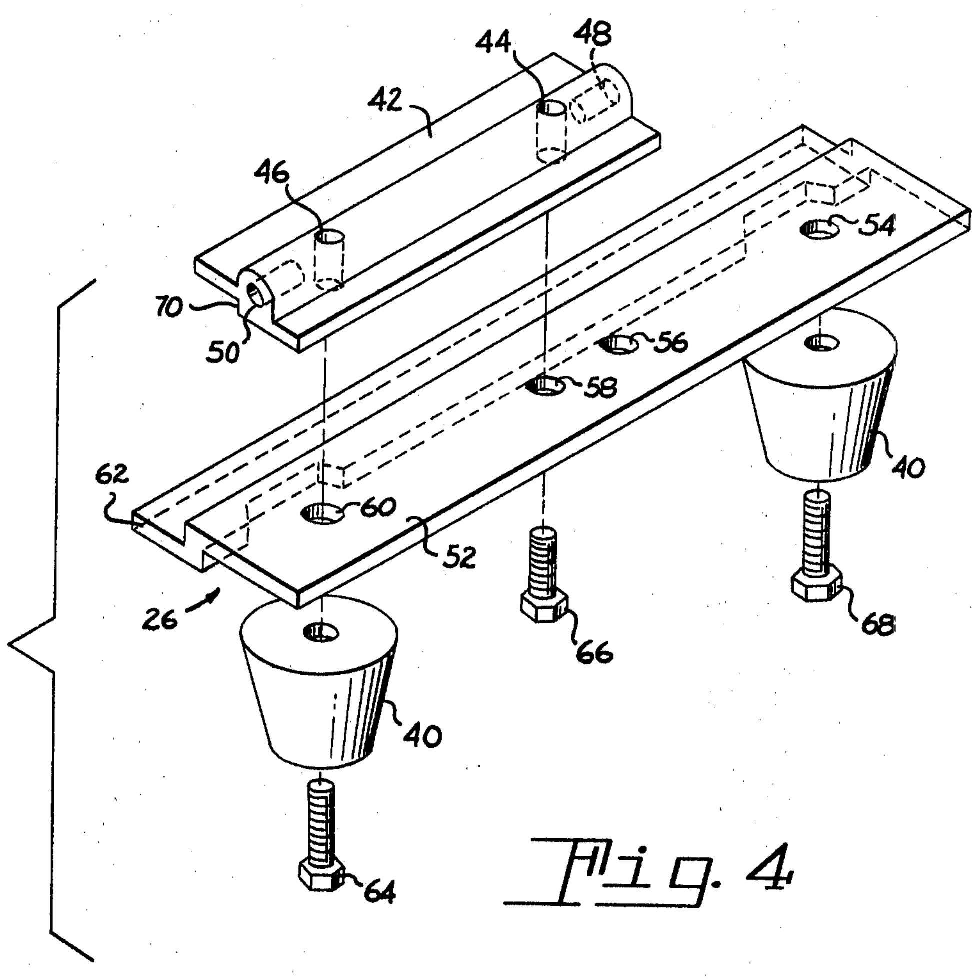
FIG. 4 is an exploded perspective view of the mounting assembly of FIG. 2.

Referring to FIGS. 2, 3 and 4, there is shown more clearly the manner in which the chassis 20 and a guide support 26 are attached to the side panel flange 22, with the chassis 20 fully inserted into the cabinet and the bottom cover 30 partially removed. A particularly significant component of the mounting assembly is the holding member 42, best shown in FIG. 4, which preferably comprises a molded plastic insulating piece having a pair of holes 44 and 46 facing the side panel flange 22 and a second pair of holes 48 and 50 facing the front and rear of the enclosure 10, respectively.

In assembly, the guide support 26 is disposed between the holding member 42 and the side panel flange 22. As best shown in FIG. 4, the guide support 26 is formed to have a top portion 52 with four mounting holes 54, 56, 58 and 60, and an offset longitudinally extending runner 62. The holding member 42, the guide support 26 and one of the mounting feet 40 are attached to the side panel flange 22 by means of a self-tapping screw 64 passing through aligned holes in one of the mounting feet 40 and side panel flange 22, through the mounting hole 60 in the guide support 26 and entering into engagement with the holding member 42. To further secure this mounting assembly a self-tapping screw 66 is passed through the side panel flange 22 and the guide support hole 58 into engagement with the holding member 42. The front mounting foot 40 is attached by a screw 68 passing through aligned holes therein and in the side panel flange 22, and through the guide support hole 54 into an engaging means not shown.

Referring particularly to FIGS. 2 and 3, the holding member 42 is shaped to form a groove 70 in cooperation with the top portion 52 of the juxtaposed guide support 26. To provide a structurally rigidizing attachment of the chassis 20 to the enclosure 10, the chassis 20 has a tab flange 72 projecting toward the side panel 12 substantially normal to the side panel flange 22. Also projecting from the chassis 20 toward the side panel 12 is a tongue flange 74, which is disposed below the tab flange 72 and is substantially parallel to the side panel flange 22. As best shown in FIG. 3, the chassis tongue flange 74 is slidably engaged in the groove 70 between the holding member 42 and the guide support 26. The tab flange 72 functions to stop the forward travel of the chassis 20 upon slidable insertion into the groove 70 and is attached to a holding member 42 by means of a self-tapping screw 76 passing through the tab flange 72 and into a hole 48 of the holding member 42. As further shown in FIG. 3, an offset runner 62 is the portion of the guide support 26 providing slidable engagement with the edge of the bottom cover 32 below the chassis 20.

The mounting assembly for attaching the chassis 20 and the guide support 28 to the side panel flange 24 is identical to that described with respect to the side panel flange 22. In fact a holding member and guide support (not shown) identical in shape to those shown in FIG. 4 are employed with respect to the side panel flange 24 mounting, commonality being provided by the inclusion of a hole 56 of FIG. 4 in the guide support 26 and a hole 50 in the holding member 42. These holes 56 and 50, although not employed with respect to the side panel flange 22, are employed when the holding member 42 and guide support 26 are oriented in the opposite direction for the side panel flange 24 mounting.

Accordingly, the overall attachment structure for the chassis 20 may be described as comprising a pair of tab flanges 72 respectively projecting from opposite sides of the chassis 20 toward the respective side panels 12 and 14 of the enclosure 10, and a pair of holding members 42 respectively attached to the side panel flanges 22 and 24 of the side panels 12 and 14, the chassis tab flanges 72 being respectively attached to the holding members 42 by screws 76. The chassis 20 further includes a pair of tongue flanges 74 respectively projecting from opposite sides of the chassis 20 and slidably engaging respective grooves 70 formed by each of the holding members 42 in cooperation with its corresponding juxtaposed guide support 26 and 28. In this manner, the chassis 20 provides rigid structural support for the side panels 12 and 14 of the enclosure 10. Nevertheless, withdrawal of the chassis 20 from the enclosure 10 for servicing requires only that the usual control knobs be removed and appropriate lead connections be disconnected, and the screws 76 attaching the tab flanges 72 to the holding members 42 be removed. Further, if the holding members 42 and the guide supports 26 and 28 are composed of insulative material, the described mounting provides the added safety feature of electrically isolating the chassis 20 from the enclosure 10 and the screws 76.

As a primary feature of the invention, the above-described enclosure 10 and chassis 20 mounting configuration permits access to the full underside of the chassis 20 for servicing merely by detachment of the back cover 32 and slidable removal of the bottom cover 30 from the guide supports 26 and 28. It will be appreciated that through use of the back cover 32 in cooperative retention of the bottom cover 30, ease of access for servicing is provided while still maintaining the requisite safety features. Thus, when the back cover 32 is in place and the conventional interlock (not shown) is closed to enable the television receiver to be operational, the bottom cover 30 cannot be removed due to the captive feature of the contoured support portion 34 of the back cover 32. The bottom cover 30 is removable to allow access to the full underside of the chassis 20 only when back cover 32 is removed for servicing.

Although the invention has been described with respect to certain specific embodiments, it will be appreciated that modifications and changes may be made by those skilled in the art without departing from the true spirit and scope of the invention.

We claim:

1. A television cabinet structure comprising in combination:
a bottomless enclosure having a pair of side panels;
an electronic component bearing chassis;
a tab flange projecting outwardly from opposite sides of said chassis toward said side panels;
a pair of holding members; and
means for attaching one of said pair of holding members to each of said side panels and to one of said tab flanges projecting from said chassis whereby said chassis rigidly supports said enclosure side panels.

2. A television cabinet structure comprising in combination:
a bottomless enclosure having a pair of side panels;
an electronic component bearing chassis;
a guide support and holding member affixed to each of said side panels and forming a groove intermediate thereto; and
a tongue flange extending outwardly from opposite sides of said chassis and into said groove for slidable engagement with said guide supports and holding members.

3. A television cabinet structure comprising in combination:
a bottomless enclosure having a pair of side panels;
an electronic component bearing chassis;
means for attaching said chassis to said pair of side panels;
a guide support having a longitudinal extending runner and affixed to each one of said side panels;
a bottom cover formed for slidable engagement with said runner of said guide support affixed to each one of said side panels; and
a back cover formed for attachment to said enclosure and confinement of said bottom cover in slidable engagement with said runner of each of said guide supports.

4. A television receiver cabinet structure comprising in combination:
a bottomless enclosure having a pair of side panels;
an electronic component bearing chassis affixed to each one of said pair of side panels forming a rigid enclosure;
a guide support having a longitudinal extending runner and a holding member forming a groove with said guide support and affixed to each one of said side panels;
a tongue flange extending outwardly from opposite sides of said chassis and in slidable engagement with said groove;
a bottom cover formed for slidable engagement with said longitudinal runner affixed to each one of said side panels; and
a back cover formed for attachment to said enclosure and confinement of said bottom cover in slidable engagement with said runner affixed to each one of said side panels.

5. The combination of claim 4 wherein said holding members are of an electrical insulating material and said chassis includes a tab flange extending outwardly from opposite sides thereof toward said side panels, and means for affixing each one of said tab flanges to a holding member whereby said chassis is retained within said enclosure.